US 6,414,294 B1
Jul. 2, 2002

(54) SENSOR SYSTEM (75) Inventors: Gillian F Marshall; Ronald A Ballingall; Stephen Collins; David J Lees, all of Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/508,464

(22) PCT Filed: Sep. 23, 1998

(86) PCT No.: PCT/GB98/02877

§ 371 (c)(1),
(2), (4) Date: Mar. 10, 2000

(87) PCT Pub. No.: WO99/17542

PCT Pub. Date: Apr. 8, 1999

(30) Foreign Application Priority Data

Sep. 26, 1997 (GB) ............................................. 9720384
Nov. 11, 1997 (GB) ............................................. 9723742

(51) Int. Cl.[7] ............................................. H01L 27/00
(52) U.S. Cl. ................ 250/208.1; 250/205; 250/214 C
(58) Field of Search ............................. 250/208.1, 205, 250/201.1, 201.2, 201.4, 214 C; 396/79, 80, 120, 121; 355/55, 56, 53

(56) References Cited

U.S. PATENT DOCUMENTS

| 4,065,788 A | 12/1977 | Meier et al. | |
| 5,373,151 A | 12/1994 | Eckel, Jr. et al. | ............ 250/208 |
| 5,446,283 A | * 8/1995 | Dautriche | ................... 250/332 |

FOREIGN PATENT DOCUMENTS

| EP | 0647064 | 4/1995 | |
| GB | 2147172 | 5/1985 | |
| GB | 2303988 | 3/1997 | |
| JP | 5149792 | * 6/1993 | ............. G01J/5/48 |

OTHER PUBLICATIONS

Patent Abstracts Of Japan vol. 017, No. 536 (P–1620), Sep. 27, 1993 –& JP 05 149792 A (Mitsubishi Electric Corp), Jun. 15, 1993 see abstract.

* cited by examiner

Primary Examiner—Robert H. Kim
Assistant Examiner—Courtney Thomas
(74) Attorney, Agent, or Firm—Nixon & Vanderhye P.C.

(57) ABSTRACT

The invention provides a sensor system (800) for generating a sensor signal ($S_{out}$) corresponding to a filtered image of a scene. The system (800) incorporates a multielement array (526) and associated processing circuits for providing element signals in response to images projected onto it and a projecting lens assembly (502) for projecting images onto the array (526). The lens assembly (502) projects differently blurred images of the scene onto the array (526) for generating a measurement signal during a measurement phase and a local spatial average correction signal during a calibration phase. A light-diffusing shutter (522) is used for generating the differently blurred images. The system (800) substracts the measurement and correction signals of each element from one another to provide a difference signal and uses this signal to generate the sensor signal ($S_{out}$) during the measurement phase. The calibration phase is repeated on change of array temperature or incident radiation intensity, thereby reducing fixed pattern noise in the sensor signal ($S_{out}$) despite environmental change, and interrupting the measurement phase only infrequently.

14 Claims, 9 Drawing Sheets

SENSOR SYSTEM

This invention relates to a sensor system for sensing radiation from a scene. It also relates to a method of sensing such radiation.

Radiation sensor systems are well known in the prior art. They find widespread application, for example, in portable consumer video and digital cameras and also in thermal imagers as employed by emergency services.

A typical system incorporates a sensor comprising a two-dimensional array of elements, each with an associated signal processing circuit. Radiation from a scene is projected onto the array where each element responds via its associated processing circuit with an output $S_k$ as given in equation [1]; the index k here is used to identify elements uniquely, i.e. $S_k$ is the output from the $k^{th}$ element circuit. The output $S_k$ includes unwanted artefacts which arise either from the scene itself or are generated within its associated element or processing circuit:

$$S_k = A_k(Rf_k, Rped_k) + B_k + N_k \qquad \text{Eq. 1}$$

where $S_k$=output generated from $k^{th}$ element via its associated processing circuit;

$A_k$=$k^{th}$ element responsivity function;

$Rf_k$ feature information or scene contrast radiation from the scene received at the $k^{th}$ element;

$Rped_k$=background radiation from the scene received at the $k^{th}$ element;

$B_k$=offset signal generated within the $k^{th}$ element and its associated processing circuit; and $N_k$=noise signal generated within the $k^{th}$ element and its associated processing circuit.

The outputs $S_k$ from each element are combined to provide a sensor signal. The sensor including its associated circuits may be based on charge coupled devices (CCDS) or metal oxide semiconductor (MOS) devices. When MOS devices are employed in particular, it is found that there is an undesirable variation in element responsivity function $A_k$, namely the elements have differing responsivities and give different outputs $S_k$ in response to the same received radiation intensity. This variation is often larger than that of sensors incorporating charge-coupled devices (CCD). It has prevented widespread use of sensors incorporating MOS devices in consumer video cameras in preference to sensors incorporating CCDs despite a long-felt want to do so in order to benefit from the compatibility of MOS detection and processing circuitry. In this connection, providing power supply and control signals for operating MOS devices tends to be less complex and less expensive compared to providing them for operating corresponding CCDs; this is because circuit parameters such as supply voltages are compatible in the former case. The variation gives rise to fixed pattern noise (FPN) in the outputs $S_k$ which results in the corresponding sensor signal depicting a speckled scene. Moreover, the elements also have differing values of the offset signal $B_k$ amongst the elements. For sensors employed to respond to low level radiation intensity, noise $N_k$ generated within their detector elements and associated processing circuits often becomes a problem, in particular flicker noise contributing to $N_k$ which has a noise spectral density which increases inversely relative to frequency.

When the sensor receives radiation from the scene, the output $S_k$ contains an unwanted pedestal component, corresponding to a general background radiation from the scene, together with a feature or contrast component which corresponds to features within the scene. This is particularly pertinent when:

(i) the sensor is detecting infra-red radiation;
(ii) the scene is at an ambient temperature of approximately 300 K; and
(iii) the temperature variations within the scene $Rf_k$ giving rise to the feature component are less than 1 K.

The pedestal component may be a factor of one thousand or more larger than the feature component. This results in poor signal contrast which may render the temperature variations difficult to identify in the outputs $S_k$ unless further signal processing is applied thereto.

The presence of the pedestal component imposes constraints and limitations on design and performance of a sensor system for sensing emissions from a scene, especially infra-red emissions therefrom. It often results in a sensor signal representing an image of the scene which is dominated by offset errors and artefacts with respect to scene contrast.

A solution which addresses the problem of pedestal component described above is disclosed in U.S. Pat. No. 5,155,348. This describes a read-out circuit for a sensor comprising a two-dimensional array of 128×128 photodetector elements responsive to infra-red radiation where each element is connected to a respective read-out circuit. The circuit has calibration and measurement phases.

During the calibration phase, a calibration image is projected onto the elements. The image may correspond to a featureless calibration object of similar temperature to a scene to be viewed or a totally blurred featureless uniform image of the scene. Each element generates a signal in response to the calibration image and its respective circuit is arranged to store a calibration signal on a storage capacitor $C_c$ incorporated within it corresponding to a signal generated by its respective element in response to the calibration image. This provides a correction for pedestal component across the array.

During the measurement phase, a focused image of the scene is projected onto the array and generates a measurement signal at each element. The calibration signal is subtracted from the measurement signal for each element to provide a difference signal. The difference signal is integrated to provide an output signal. The circuits produce respective output signals scanned by a multiplexer to give a compound sensor signal.

This solution reduces the dynamic range of the compound sensor signal by removing pedestal component at each element. It eases dynamic range performance requirements of remote circuits receiving the sensor signal from the multiplexer, for example allowing use of analogue-to-digital converters of 8-bit resolution instead of 12-bit resolution.

A technique for reducing FPN is described in a U.S. Pat. No. 5,373,151. The specification is concerned with an optical system which projects focused and periodically defocused images of a scene onto a multielement focal plane array for generating at each element corresponding focused and defocused signals respectively. A difference signal for each element is derived by subtracting its associated defocused signal from its focused signal. Difference signals from the elements are combined together to provide a system output in which FPN artefacts have been reduced.

Despite use of FPN correction in the prior art, it is found in practice that image quality in the prior art does not remain as good as the initial correction would suggest and it is necessary to recalibrate repeatedly. Reasons for this inconsistency are not presently disclosed in the prior art.

It is an object of the invention to provide a sensor system with more effective FPN correction.

According to the present invention, a sensor system is provided for generating a sensor signal corresponding to a filtered image of a scene, the system incorporating:

(i) detecting means incorporating a plurality of detector elements for generating first and second element signals during first and second detection phases respectively; and (ii) processing means for deriving a difference signal from the element signals for use in generating the sensor signal, characterised in that the processing means incorporates sensing means for sensing at least one environmental factor influencing responsivity of the elements and the system is arranged to repeat both of the first and second phases in response to environmental change.

The invention provides the advantage that the sensor system undergoes recalibration to reduce FPN when only when necessary when changes in any one of environmental factors influencing responsivity of the system occurs.

A first problem with the detection circuit described in the U.S. Pat. No. 5,155,348 and with the system described in U.S. Pat. No. 5,373,151 is that the responsivity function $A_k$ in Eq. 1 of their detector elements is influenced by temperature. In consequence, FPN correction described in these two specifications becomes inaccurate when their detector element temperature changes. Moreover, a second problem is that variation in the function $A_k$ of the detector elements will vary with received radiation level; for example, elements in a multielement detector array often exhibit mutually identical responsivities at relatively higher received radiation levels and mutually different responsivities at relatively lower received radiation levels. This means that FPN correction determined at relatively higher received radiation levels will be inaccurate if used at lower received radiation levels. This temperature and radiation level sensitivity of the responsivity function $A_k$ of elements is not appreciated in the prior art.

A conventional approach to addressing the first problem is to stabilise multielement detector array temperature, for example by using temperature controlled elements thermally coupled to the detector array. The temperature controlled elements may, for example, comprise Peltier elements although these have a disadvantage of associated bulk, cost, high power consumption and slow thermal response. Moreover, many conventional optical systems incorporate iris components for stabilising global detector array illumination; such iris components are frequently employed in conventional 35 mm film cameras incorporating automatic exposure control. These iris components are often precision optical parts which are prone to mechanical wear.

Although FPN reduction is described in the U.S. Pat. Nos. 5,155,348 and 5,373,151, frequent regular recalibration to reduce FPN is undesirable because:

(i) interruption of sensor signal occurs during an associated calibration phase; and (ii) mechanically actuated optical components for providing blurred and unblurred images are prone to mechanical wear and related unreliability problems.

When the sensor is outputting at high frame rates, for example 25 images/second in video applications, periodic interruption of its sensor signal for recalibration is undesirable where the calibration phase is substantially equal or longer in duration than the measurement phase. Mechanical actuation of optical components is a relatively slow process, for example actuating a 50 g lens through a distance of 1 mm using a compact linear actuator to project focused and defocused images will often take 50 msec. Interruption of the sensor signal can result in flicker therein, and can, for example, result in control instability problems when the sensor signal is employed in a visual feedback control system. Visual feedback control systems comprise, for example, robotic fruit picking equipment for use in agriculture and security inspection systems.

The problems described above are reduced, according to the present invention, by arranging for a sensor adapted to execute calibration and measurement phases for reducing FPN as described in the U.S. Pat. Nos. 5,155,348 and 5,373,151 to perform its calibration phase in response to one or more environmental parameters affecting sensor characteristics changing by more than a threshold amount compared to its value when the calibration phase was most recently executed.

The environmental factors include, for example, any one of:

(i) system temperature; and (ii) total amount of radiation received at the system from the scene.

Thus, (i) the sensing means may be responsive to at least one of temperature and illumination at the detecting means; and (ii) the system may be arranged to repeat both the first and second phases in response to change in at least one of temperature and illumination by more than a preset value.

FPN reduction in the sensor is achievable by making one of the images a local spatial average image of the scene. The local spatial average image is obtainable by making one of the images a diffuse image of the scene. The system may, therefore, incorporate projecting means for projecting scene images onto the detecting means so that at least one element signal is generated during a diffuse image phase.

The projecting means may incorporate actuating means for interposing radiation scattering means between the scene and the detecting means. This provides the advantage of a practical mechanical arrangement for generating diffuse images. For example, the scattering means may be interposed for generating diffuse images with relatively low mechanical precision compared to the accuracy with which the projecting means must be maintained relative to the detecting means for projected a finely focused image thereonto; thus, the system can be converted from one projecting a finely focused image to one projecting a blurred image merely by imprecise interposition of the scattering means without disturbing position of the projecting means relative to the detecting means.

The actuating means may comprise at least one of solenoid means and means for translating and rotating the scattering means to interpose it between a scene and the detecting means. This provides the advantage that the actuating means can be adapted to suit various mechanical constraints imposed by external packaging of the system, for example its shape of enclosure, cabinet or casing.

The scattering means may incorporate at least one of the following: a ground glass plate, a translucent plastic sheet, a sheet of tracing paper, a microprism sheet, a Fresnel plate and a phase plate. This provides the advantage of a selection of practical integers for use in generating diffuse images.

The projecting means may be arranged so that radiation corresponding to that receivable on one element from a focused image is received by between two elements and 64% of the elements when the image is diffuse. This provides the advantage of being a useful practical range of blurring for achieving FPN reduction.

The system may be adapted so that:
(i) it incorporates projecting means for projecting scene images onto the detecting means;
(ii) the projecting means is arranged to project a local spatial average image onto the detecting means during one of the phases and a focused measurement image during another of the phases; and
(iii) the processing means is arranged to generate the sensor signal from the element signals derived from the local average and measurement images.

This provides the advantage that FPN reduction is achievable by incorporating projecting means into the system for projecting a local spatial average image of the scene onto the detecting means.

The measurement image may be projected onto the detecting means prior to the local spatial image, thereby providing image tone reversal in the sensor signal. This provides the advantage of the system simultaneously performing FPN and tone reversal simultaneously. Tone reversal here is defined as regions of the scene which are more radiation emissive than other regions thereof being represented as relatively darker areas in the sensor signal compared to the other regions represented in the signal.

The projecting means may incorporate a liquid crystal spatial light modulator configured to be controllable between a first substantially non-scattering state and a second diffusing state as regards transmission of radiation from the scene to the detecting means in both cases. This provides the advantage of being a simple approach for generating diffuse images without needing to use mechanically actuated components which are prone to wear.

The liquid crystal modulator may be a polymer dispersed liquid crystal device (PDLC) having scattering and non-scattering states which are selectable in response to a control potential applied to the device. This provides the advantage of being a simple device which is conveniently switchable from one state to another and which does not require polarising filters to operate unlike other types of liquid crystal devices. Moreover, it responds more rapidly and is more compact than mechanically actuated diffusing shutters.

The system may be incorporated into one or more of a digital stills camera, a video camera, a personal electronic organiser and a mobile telephone. When the system is employed in a digital stills camera or a video camera, it provides FPN correction which allows CMOS detectors to be employed in these cameras. Personal electronic organisers often operate with limited supply potentials available for electronic components incorporated therein from their batteries; the invention enables a sensor system employing CMOS devices to be incorporated into the organisers, for example for imaging and scanning documents presented to the organisers. The invention incorporated into a mobile telephone provides data entry of images into the mobile telephone thereby providing a videophone; the invention provides the advantage of enhanced image quality, especially when the mobile telephone is used infrequently and is subject to extreme temperature variations when in use.

In another aspect, the invention provides a method of providing from a sensor system a sensor signal corresponding to a filtered image of a scene, the method including the steps of:
(a) monitoring a multielement detector incorporated into the system to measure environmental factors influencing its responsivity;
(b) arranging for a projector in the system to project a first image onto the detector during a first phase to provide a first signal at each element;
(c) recording the first signal of each element;
(d) arranging for the projector to project a second image onto the detector during a second phase to provide a second signal at each element, at least one of the first and second images being a scene image;
(e) deriving a respective difference signal from the first and second signals of each element from the second element signal of each element to provide a difference signal;
(f) outputting the difference signal for each element collectively to provide the sensor signal;
(g) monitoring the detector environment to detect changes influencing its responsivity; and
(h) repeating either steps (d) to (g) or steps (b) to (g) according to whether environmental change is or is not detected to be less than a prearranged threshold.

In a further aspect, the invention addresses a problem of generating a local spatial average image for use in performing FPN correction. In the prior art, for example in the U.S. Pat. No. 5,155,348 and in the system described in the U.S. Pat. No. 5,373,151, a local spatial average image is created by projecting a defocused image of a scene. This involves actuating optical projection components between states where they project focused and defocused images.

In the further aspect, the invention provides a sensor system for generating a sensor signal corresponding to a filtered image of a scene, the system incorporating:
(i) detecting means incorporating a plurality of detector elements for generating first and second element signals during first and second detection phases respectively; and
(ii) processing means for deriving a difference signal from the element signals for use in generating the sensor signal, characterised in that the system incorporates projecting means for projecting scene images onto the detecting means (528) so that at least one element signal is generated during a diffuse image phase.

The invention provides the advantage of being a practical approach to generating a local spatial average image. For example, a diffuse image may be generated during a diffuse image phase by interposing scattering means with relatively low mechanical precision compared to the accuracy with which projecting means must be maintained relative to the detecting means for projected a finely focused image thereonto; thus, the system can be converted from one projecting a finely focused image to one projecting a blurred image merely by imprecise interposition of the scattering means without disturbing position of the projecting means relative to the detecting means.

In order that the invention might be more fully understood, embodiments thereof will now be described, by way of example only, with reference to accompanying drawings, in which.

Figure 1:
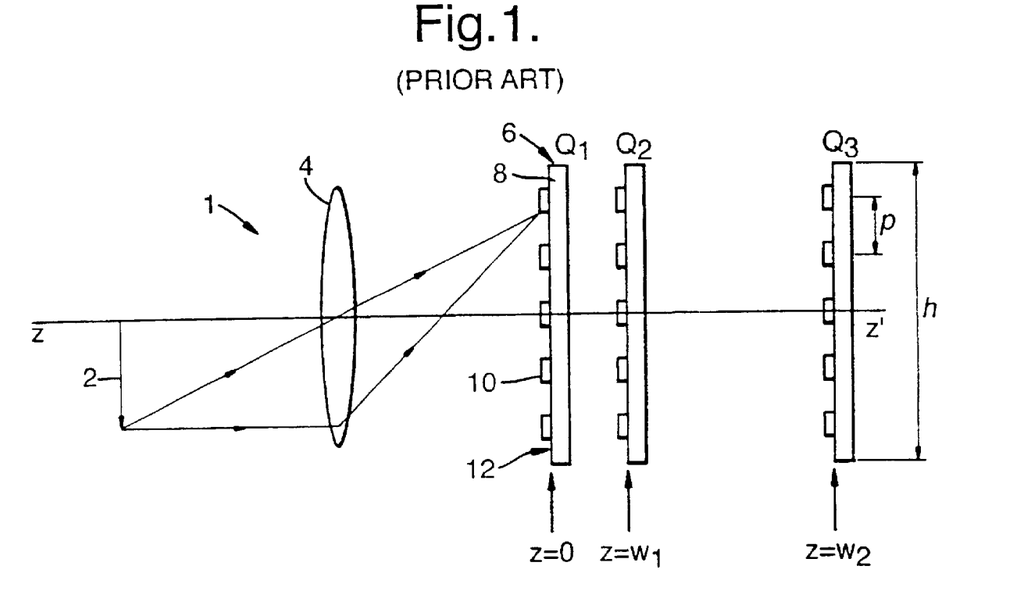
FIG. 1 is a schematic illustration of a sensor system.

FPN reduction will now be described with reference to FIG. 1. In FIG. 1, there is shown a schematic illustration of a sensor system indicated generally by 1. It comprises an object 2, an imaging lens 4 and a focal plane array 6. The array 6 incorporates a substrate 8 onto which an array of uniformly distributed detector elements, such as an element 10, are bonded onto a front element surface 12 thereof. The surface 12 is a rectangular area with a longer side length of h as shown. Each element is spaced from its nearest contiguous neighbouring elements by an interelement distance p between centres as shown. The object 2, the lens 4 and the array 6 are located in sequence on an optical axis z–z' which perpendicularly intersects the surface 12. The array 6 is illustrated in three alternative positions, namely positions $Q_1$, $Q_2$, $Q_3$ which are respectively the positions of focused, partially blurred and completely blurred uniform images of the object 2 projected by the lens 4 onto the array 6. At the positions $Q_1$, $Q_2$, $Q_3$, the array 6 is at distances of 0, $w_1$, $w_2$ respectively along the axis z–z'. The elements are responsive to photons emitted from corresponding regions of the object 2 to provide detector signals.

Emitted and reflected radiation from the object 2 which is transmitted throughout the lens 4 subtends a range of angles of 0 to $\alpha_{max}$ radians relative to the axis z–z' when incident on the array 6 at the position $Q_1$. Radiation which is incident upon one element 10 of the array 6 in the position $Q_1$ is spread over the surface 12 by a distance of up to $F_{max}$ from the element 10 in the positions $Q_2$, $Q_3$ as provided by equations [2], [3] respectively:

$$F_{max} = \alpha_{max} w_1 \qquad \text{Eq. 2}$$

$$F_{max} = \alpha_{max} w_2 \qquad \text{Eq. 3}$$

For the purpose of this specification, a focused image is one which is substantially in focus, namely where $F_{max}$ is less than the distance p. A partially blurred image is one in which spatial features are discernible but fine spatial features therein are blurred. A defocused image is one which is uniformly blurred so that spatial features are substantially indiscernible.

Figure 2:
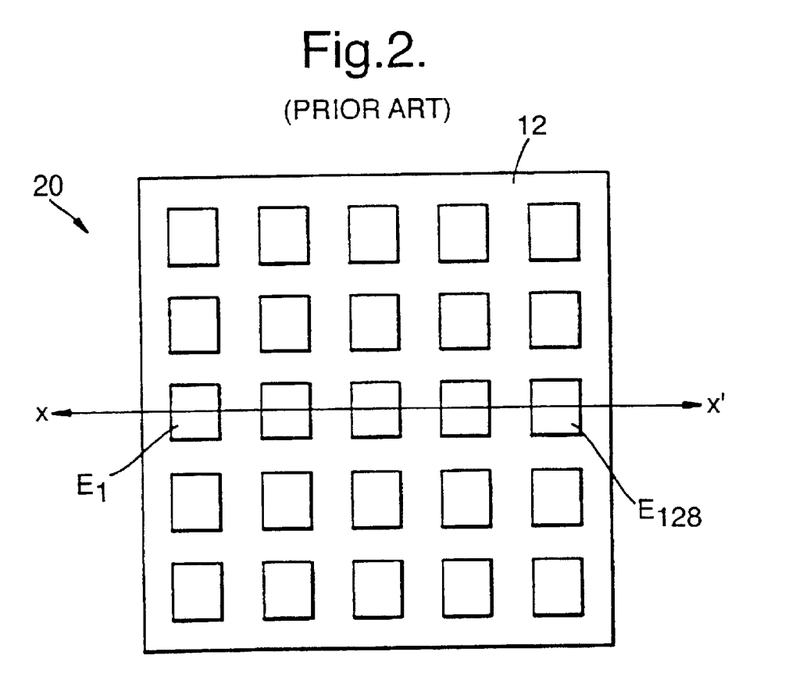
FIG. 2 is a schematic illustration of a prior art focal plane array of the system in FIG. 1.

In FIG. 2, there is shown a front view to the surface 12 of the array 6 in FIG. 1 looking in a direction z–z'. For clarity, an array incorporating a two-dimensional field of 5×5 elements is illustrated in FIG. 2 to represent the array 6 which incorporates a field of 128×128 elements, namely 128 columns of elements and 128 rows of elements. The rows and columns are mutually orthogonal. An axis x–x' is shown which is parallel to the surface 12 and intersects a row of elements, namely a row of elements comprising an element $E_1$ near one edge of the array 6 and an element $E_{128}$ near another edge of the array 6 as shown. Elements $E_2$ to $E_{127}$ are located in a contiguous sequence along the axis x–x' between the element $E_1$ and the element $E_{128}$, for example the element $E_2$ is located between the element $E_1$ and the element $E_3$, the element $E_{127}$ is located between the element $E_{126}$ and the element $E_{128}$, and so on.

Figure 3:
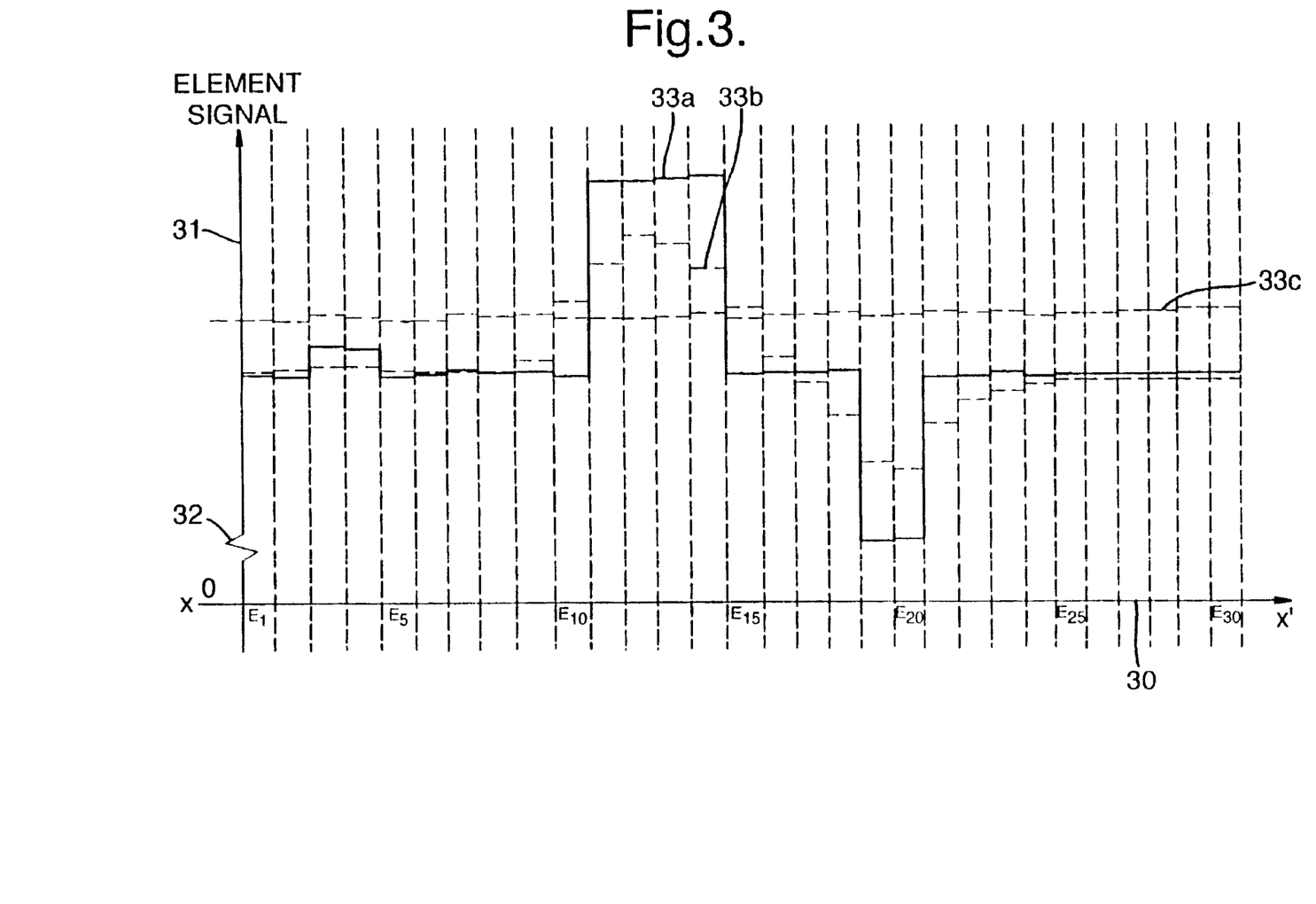
FIG. 3 is a graph of detector signals along an axis on the array in FIG. 2.

In FIG. 3, there is shown a graph of detector signals from each of the elements $E_1$ to $E_{30}$, namely from a row of elements from the element $E_1$ to the element $E_{30}$ which are located approximately quarter of a distance from the element $E_1$ to the element $E_{128}$ along the axis x–x'. The graph has an abscissa axis 30 indicative of element position distance along the axis x–x'. It also has an ordinate axis 31 corresponding to detector signals from the elements. The axis 31 incorporates a discontinuity 32 so that contrast information in the graph is shown exaggerated with reference to the ordinate axis 31. Curves 33a (solid line), 33b (dashed line), 33c (chain line) corresponds to detector signals for the focused image at the position $Q_1$, to the partially blurred image at the position $Q_2$ and the defocused image at the position $Q_3$ respectively. The curve 33a incorporates feature information at the elements $E_3$, $E_4$, $E_{11}$, $E_{12}$, $E_{13}$, $E_{14}$, $E_{19}$, $E_{20}$ corresponding to radiation emission variations in the object 2 arising from temperature variations therein. The variation at the elements $E_3$, $E_4$ is less than the variations at the elements $E_{11}$, $E_{12}$, $E_{13}$, $E_{14}$, $E_{19}$, $E_{20}$. The curve 33c corresponds to an average radiation emission from the object 2 and is used as a correction signal for pedestal component removal as in the prior art. Irregularities in the curve 33c arise from differences in responsivity amongst the elements. The curve 33b corresponds to a local average radiation emission from the object 2 which varies across the array 6.

Figure 4:
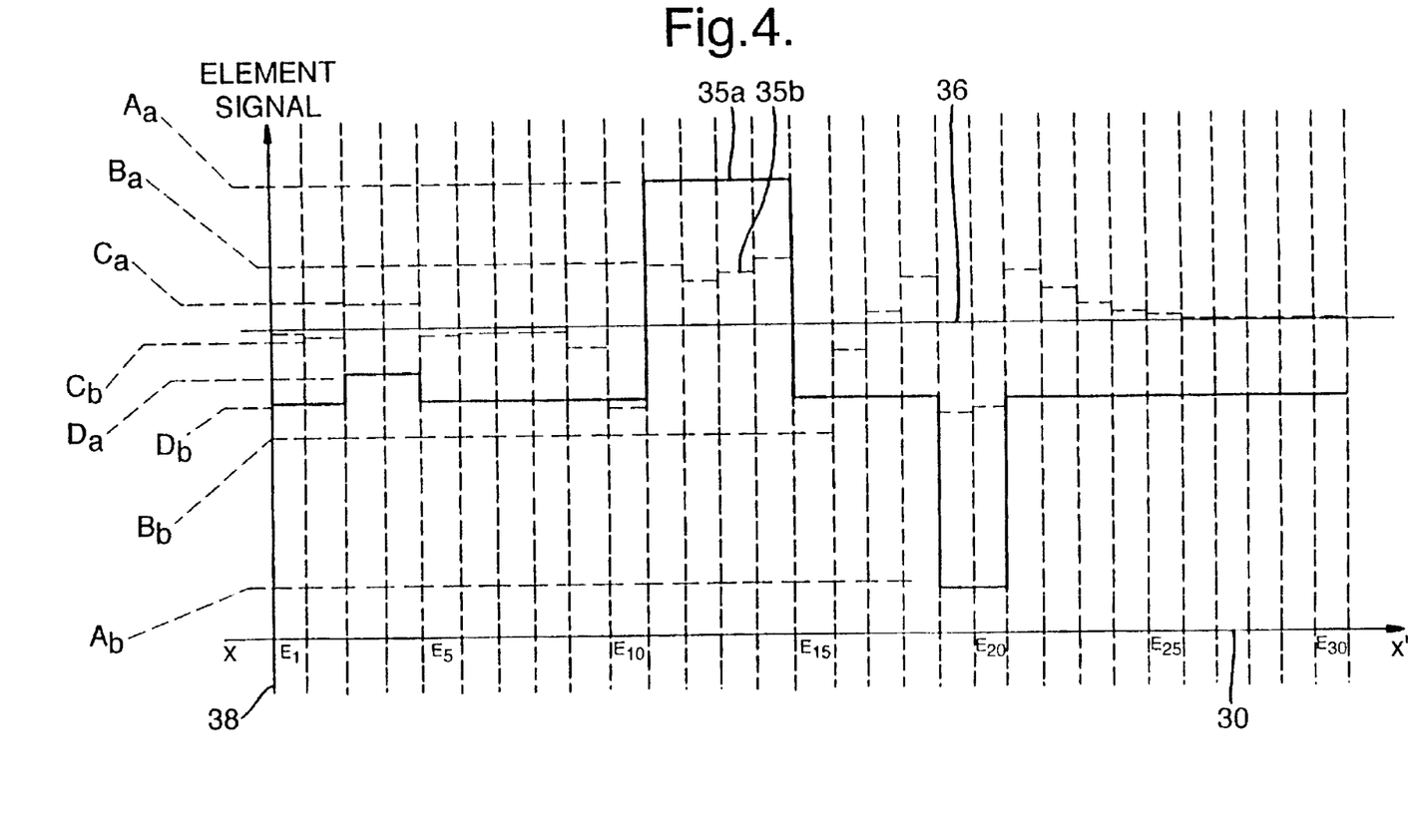
FIG. 4 is a graph of the signals in FIG. 3 corrected by a global pedestal correction and also a local pedestal correction.

In FIG. 4, there is shown a graph of the detector signals from each of the elements $E_1$ to $E_{30}$ where the curves 33b, 33c have been subtracted from the curve 33a to provide curves 35b, 35a respectively. The curves 35a, 35b are shown as solid and dashed lines respectively. The abscissa axis 30 corresponds to element position distance along the axis x–x' in FIG. 2. A line 36 corresponds to zero value. An ordinate axis 38 corresponds to a corrected element signal where a pedestal component for each element has been subtracted. The curve 35a corresponds to relative spatial emission from the object 2, namely as in a radiometer output. The curve 35b corresponds to a filtered version of the curve 35a in which local variations in emission from the object 2 are accentuated.

The curve 35a is contained within a first dynamic range of $A_a$ to $A_b$. A local variation at the elements $E_3$, $E_4$ is contained within a second dynamic range of $D_a$ to $D_b$. Removal of local pedestal components results in the curve 35b which is contained within a third dynamic range of $B_a$ to $B_b$. A fourth dynamic range of $C_a$ to $C_b$ contains the local variation at the elements $E_3$, $E_4$ in the curve 35b.

The fourth dynamic range is a larger proportion of the third range compared to the second range as a proportion of the first range, namely $$\frac{C_a - C_b}{B_a - B_b} > \frac{D_a - D_b}{A_a - A_b} \qquad \text{Eq. 4}$$

As a result, the curve 35b does not correspond to a relative radiometer output but contains small local variations in emission from the object 2 accentuated relative to larger variations arising from other regions of it. Feature edges are thereby accentuated in the curve 35b which enhances visual intelligibility of the object 2 as determined therefrom.

A degree of partial blurring provided at the position $Q_2$ may be selected to provide a preferred degree of filtration in the curve 35b. If a point in the focused image at the position $Q_1$ is blurred to 100% of the image at the position $Q_2$, the curves 35a, 35b become identical in which case filtration is not obtained. If the degree of blurring is reduced to approach full focus, namely the positions $Q_1$, $Q_2$ are coincident, the curve 35b will be of zero value for all the elements. In practice, the degree of blurring may be selected, for example, so that a point in the image at the position Q, is blurred in a range of spreading of over nearest surrounding contiguous elements (p) to 25% of elements in the array 6. The degree of blurring may be made adjustable, either by manual or automatic control, to provide a desired degree of filtration.

For further explaining operation of the system 1, the image of the object 2 projected by the lens 4 onto the elements E arranged in a Cartesian x-y plane incorporating the surface 12 is described by equation [5]:

$$L(x, y, z) = \int \int K(x-x_0, y-y_0, z) L(x_0, y_0, 0) dx dy \quad \text{Eq. 5}$$

where $x_0$, $y_0$=x-axis, y-axis Cartesian co-ordinates in a plane where z=0 which contains the image in focus, namely at position $Q_1$;

z=z-axis Cartesian ordinate along the axis z–z', for example at position $Q_2$;

x, y=x-axis, y-axis Cartesian co-ordinates in a plane which contains the image blurred when z is not equal to 0, for example at position $Q_2$;

K=blurring function provided by the lens 4; and

L=a function describing the image.

The curve 35b corresponds to a difference signal $D(x_0, y_0)$ which is a difference between first and second images, the first image with a z-ordinate $z_1=0$ at the position $Q_1$, and the second image with a z-ordinate $z_2=w_1$ at the position $Q_2$ as described by equation [6]:

$$D(x,y) = L(x,y,z_1) - L(x,y,z_2) \quad \text{Eq. 6}$$

In a condition where $w_1=0$, the functions $L(x, y, z_1)$ and $L(x, y, z_2)$ will be identical and will both contain feature information but will result in $D(x, y)$ being zero. This arises if identically blurred images are projected onto the array 6 in the positions $Q_1$, $Q_2$ resulting in the curve 35b devoid of any feature information; this arises if the positions $Q_1$ and $Q_2$ are identical.

By geometrical optical constraints governing the function K, a limit $F_{max}$ to a degree of blurring obtainable from the lens 4 is described by equation [7]:

$$F_{max} = z \tan \alpha_{max} \quad \text{Eq. 7}$$

where $\alpha_{max}$=maximum ray semiangle relative to the axis z–z' of radiation forming the image on the array 6.

Thus, if a focused image is presented to the array 6 in the position $Q_1$ where z=0 in equation [7], image features smaller than $z \tan \alpha_{max}$ will be accentuated in a resulting filtered output in the curve 35b represented by D(x, y). These image features will correspond to non-uniform spatial components present in the image which are affected by blurring. These spatial components correspond generally to feature information of importance for interpreting the image.

Figure 5:
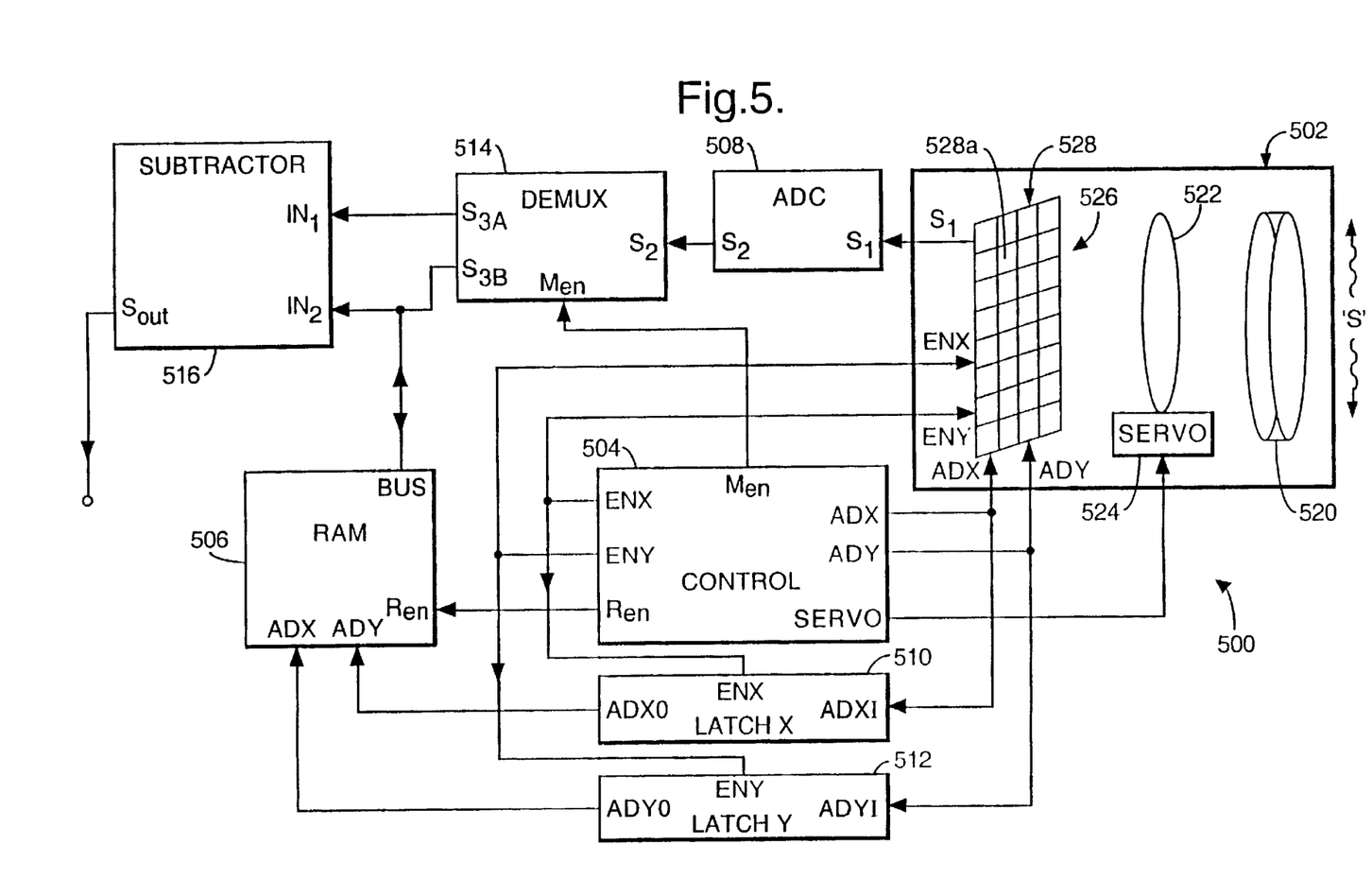
FIG. 5 is a schematic illustration of an embodiment of the invention incorporating a random access memory separate from an array.

A sensor system 500 of the invention is shown in FIG. 5. It comprises a camera 502, a controller unit 504, a frame store (RAM) 506, an analogue-to-digital converter (ADC) 508, two address latches 510, 512, a demultiplexer (DEMUX) 514 and a subtractor unit 516; these are connected together as shown in the diagram and as described later.

The camera 502 incorporates an imaging lens unit 520, a translucent shutter 522 actuated by an actuating mechanism 524, and an array 526 of metal oxide semiconductor (MOS) photodetecting elements 528 such as an element 528a. The lens unit 520, the shutter 522 and the array 526 are disposed along an optical axis (not shown) of the system 500. The shutter 522 is mounted nearer to the lens unit 520 than it is to the array 526; this provides the system 500 with a more diffuse image for calibration than would be available if the shutter 522 were mounted nearer to the array 526 than the lens unit 520. Biasing resistors, clock signal lines and power supply lines associated with integers 520 to 528 are not included in FIG. 5 because these are well known to those of ordinary skill in the art.

The array 526 is a proprietary FUGA-15 device manufactured by C-CAM Technologies SA incorporating an array of 512×512 photodetecting elements responsive to radiation in a wavelength range of 400 nm to 1000 nm. It incorporates electronic circuits for multiplexing output from each photodetecting element 528 therein to provide an analogue output $S_1$ therefrom. The array also incorporates address inputs ADX, ADY and enabling inputs ENX, ENY. The circuits are configured to provide a signal at the output $S_1$ from an element 528 referenced by addresses provided at the inputs ADX, ADY when the inputs ENX, ENY are set in an enabled state.

The controller unit 504 is a fully programmable gate array (FPGA) type Max9000 manufactured by Altera and configured to operate at a 40 MHz clock rate. The RAM 506 comprises a set of four proprietary static random access memory devices of type CY62170 manufactured by Cypress Semiconductor Ltd. It is arranged into 512×512 memory cells, each cell for storing 16 bits of information. The ADC 508 incorporates a 12-bit pipelined semiflash converter device type ADS800 manufactured by Analogue Devices Inc., and a video amplifier type AD817AN manufactured by Analogue Devices Inc. to buffer between the array 526 and the semiflash converter device. The latches 510, 512 each comprise two QS74FCT373 octal latch devices manufactured by Quality Semiconductor Ltd. The demultiplexer 514 incorporates four octal buffer devices type QS74FCT541 manufactured by Quality Semiconductor Ltd. which are configured in pairs to provide two outputs $S_{3A}$, $S_{3B}$ and a single input $S_2$. The subtractor unit 516 is a standard parallel input, parallel output 12-bit device of known kind.

The mechanism 524 is configured to move the shutter 522 between first and second positions depending upon a control input SERVO provided to it from the controller unit 504. The shutter 522 is positioned in the first position so that it does not intercept radiation passing from the unit 520 to the array 526, and in the second position so that it scatters radiation passing through it from the unit 520 to the array 526. The shutter 522 incorporates a ground glass plate which transmits and scatters visible radiation whilst attenuating only substantially 5% of radiation incident thereupon. It provides a scattering characteristic where radiation received by an element 528 at a central region of the array 526, namely a reference element, when the shutter is in the first-position is scattered so that 90% of it illuminates in a range of nearest adjacent elements to the reference element to 64% of elements 528 contiguous to the reference element in the array 526 in the second position. The shutter 522 incorporates many thousands of light scattering sites which assist to provide a blurred transmitted image suitable for performing calibration of the system 500.

The ADC 508 is configured to convert the output $S_1$ to an equivalent 12-bit digital output $S_2$. The demultiplexer 514 is configured to demultiplex its input $S_2$ to its two outputs $S_{3A}$, $S_{3B}$ as instructed by the control unit 504 at a control input $M_{en}$.

The RAM 506 incorporates address inputs ADX, ADY, an enable input $R_{en}$ and a bi-directional input-output bus (BUS). It is configured to store and retrieve data in a memory cell associated with an address reference at its inputs ADX, ADY when the controller 504 instructs it via its $R_{en}$ input. Data is input to and output from the RAM 506 via its bus.

The subtractor 516 is configured to calculate a difference between data input at its inputs $IN_1$, $IN_2$ to provide an output $S_{out}$ from the system 500.

Operation of the system 500 will now be described with reference to FIG. 5. An operator of the camera 502 commences by directing it towards a scene represented by 'S'.

In a calibration mode of the system 500, the mechanism 524 is instructed by the controller unit 504 to move the shutter 522 into the second position to interpose it between the lens unit 520 and the array 526. The scene emits visible radiation which is transmitted by the unit 520 through the shutter 522 to form a diffuse protected image of the scene on the array 526. The elements 528 respond to the diffuse image and each element's output is multiplexed by instruction from the controller unit 504 into the output $S_1$. The ADC 508 converts the output $S_1$ from the array 526 into a digital signal at its output $S_2$. The output $S_2$ is demultiplexed through the demultiplexer 514 to the output $S_{3B}$ from where it is input to the RAM 506 in which it is then stored. Output from each element 528 in the array 526 is thereby stored in its corresponding memory cell in the RAM 506 to provide calibration data.

In a measurement mode of the system 500, the camera 502 is directed towards the scene as in the calibration mode described above. The mechanism 524 in instructed by the controller unit 504 to move the shutter 522 into the first position where it does not intercept radiation from the scene. The unit 520 projects a non-diffuse image of the scene onto the array 526 and the elements 528 respond thereto. The array 526 is instructed by the controller 504 to multiplex output from one of the elements 528 to provide the output $S_1$ which is converted in the ADC 508 to a digital signal at its output $S_2$. The output $S_2$ is then multiplexed through the multiplexer 514 to the input $IN_1$ of the subtracting unit 516. The control unit 504 also instructs the RAM 506 to output stored data at its bus to the input $IN_2$ corresponding to the element 528 whose output is at the input $IN_1$. The subtraction unit 516 calculates a difference between the signals at the inputs $IN_1$, $IN_2$ and outputs this difference at the output $S_{out}$ to provide the output from the system 500. The controller unit 504 repeats this subtraction operation for each element 528 in the array 526.

The output $S_{out}$ corresponds to subtraction of the response of each element 528 to the diffuse image of the scene from its response to the non-diffuse image of the scene. Defects due to flicker noise and variations in element offset and responsivity, namely FPN, are reduced in the data provided at the output $S_{out}$ compared to the output at $S_1$ directly from the array 526 during measurement mode. Defects due to temperature dependence of element offset and responsivity with temperature are also reduced in the output $S_{out}$.

The system 500 provides an advantage of using generally available components employed in the prior art for implementing the invention. The shutter 522 provides a diffuse image for FPN reduction without there being a requirement to alter position of the lens unit 520 relative to the array 526 when switching between calibration and measurement modes. Moreover, the shutter 522 may be interposed between the lens unit 520 and the array 526 with relative imprecision and yet provide beneficial FPN reduction in comparison to creating blurred images for FPN reduction by moving the lens unit 520 relative to the array 526.

The system 500 may be used in a number of applications, for example:
(i) in digital stills cameras for recording static images;
(ii) in video cameras for recording moving images;
(iii) in personal electronic organisers, for example for recording documents; and
(iv) in mobile telephones.

When the system 500 is employed in a digital stills camera or a video camera, it provides FPN correction which allows CMOS detecting elements to be employed in these cameras. Personal electronic organisers often operate with limited supply potentials available for electronic components incorporated therein from their batteries; the sensor system 500 employing CMOS detecting elements may be incorporated into the organisers, for example for imaging and scanning documents presented to the organisers. The invention incorporated into a mobile telephone provides data entry of images into the mobile telephone thereby providing a videophone; the invention provides the advantage of enhanced image quality.

The output $S_{out}$ may be displayed on a screen, stored in a memory device for future display or further processing, or printed where the system 500 forms part of an electronic camera system. The memory device may be a rewritable EEPROM which provides data retention when electrical supply to it is removed.

The MOS array 526 of the system 500 may be substituted with a CCD array. The system 500 will in this embodiment provide similar advantages as for the MOS array 526, namely reduction in flicker noise, FPN and offset drift. Moreover, the mechanism 524 may incorporate one or more of a solenoid and a motor for at least one of linearly and rotationally moving the shutter 522.

Moreover, the lens unit 520 may be moved by the mechanism 524 relative to the array 526 during the calibration mode to project a partially blurred image of the scene onto the array instead of employing the shutter 522.

The shutter 522 may incorporate, instead of the ground glass plate, a translucent plastic sheet, a sheet of tracing paper, a microprism sheet, one or more Fresnel plates, or one or more phase plates for diffusing radiation from the scene. The shutter 522 may be pivotally mounted as in a standard (SLR) reflex camera. Alternatively, it may be mounted on a rotatable carrier for rapid insertion and extraction between the array 526 and the lens unit 520.

The shutter 522 and its actuating mechanism 524 may be replaced by a liquid crystal shutter configured to operate between clear and partially opaque states; a liquid crystal shutter is a form of spatial light modulator. In this case, movement of the shutter 522 is not required when switching between the calibration and measurement modes. The liquid crystal shutter may be a polymer dispersed liquid crystal device (PDLC) configured to scatter visible radiation transmitted through it in one state and transmit light substantially unscattered through it in another state depending upon bias potential applied thereto. The PDLC incorporates droplets of nematic liquid crystal dispersed in a continuous isotropic polymer matrix; it is fabricated by mixing monomer with liquid crystal and then polymerising the monomer to form a solid suspension of liquid crystal droplets in a polymer matrix. The nematic liquid crystal employed in the PDLC may have positive dielectric anisotropy so that it scatters light through it when zero bias is applied to it in a first state and transmits light substantially unscattered through it in a second state when a bias potential is applied to it.

Alternatively, the liquid crystal may have negative dielectric anisotropy so that it scatters light through it when a bias is applied to it in a first state and transmits light substantially unscattered through it in a second state when zero bias potential is applied to it. Liquid crystal having a negative dielectric anisotropy incorporates molecules which become aligned orthogonally to an electric field generated by applying bias potential to the device; this is advantageous because a bias potential is only required during calibration of the system 500. Moreover, the system 500 may be operated so that it alternately executes its calibration mode and measurement mode, or configured to execute its measurement mode a number of times before returning to its calibration mode. Furthermore, the system may also be configured when viewing the scene to execute the measurement mode first followed by the associated calibration mode; this provides an advantage where the system is employed in a stills camera of allowing the operator to capture a view of the scene immediately without first having to execute the calibration mode.

The RAM 506 in the system 500 may be substituted with a dynamic random access memory (DRAM) device. DRAMs are generally less expensive than SRAMs thereby allowing cost of the system 500 to be reduced. The system 500 may be configured so that the array 526 is substituted with an array providing multiple signal outputs, each output connected to its own ADC whose output is multiplexed to provide the signal $S_2$. This allows slower ADCs to be employed; this is particularly advantageous when the array incorporates more than 512×512 elements.

Figure 6:
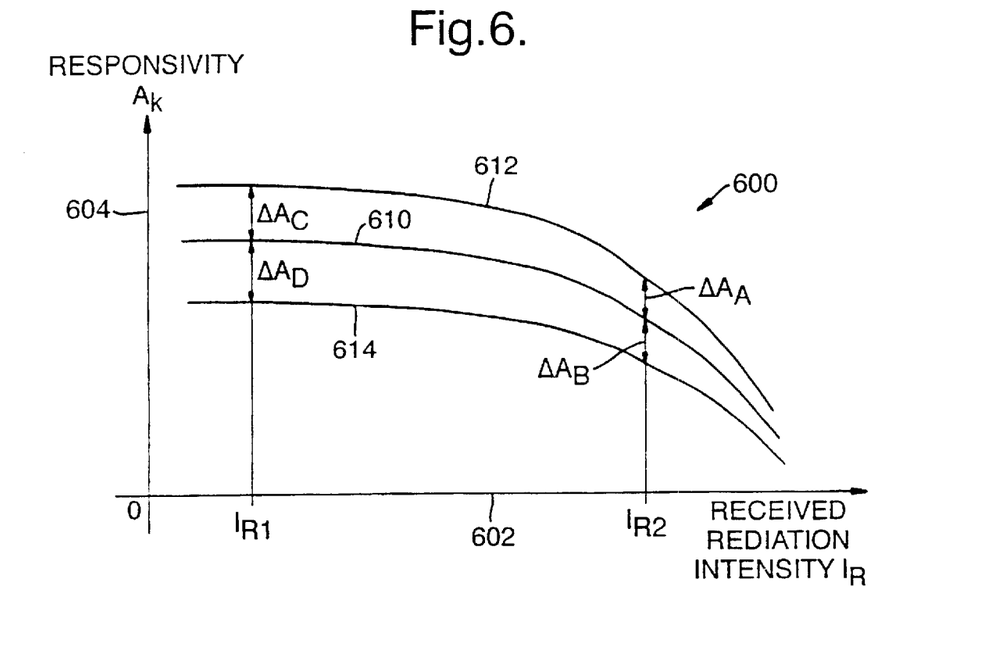
FIG. 6 is a graph illustrating element responsivity as a function of received radiation intensity.
Figure 7:
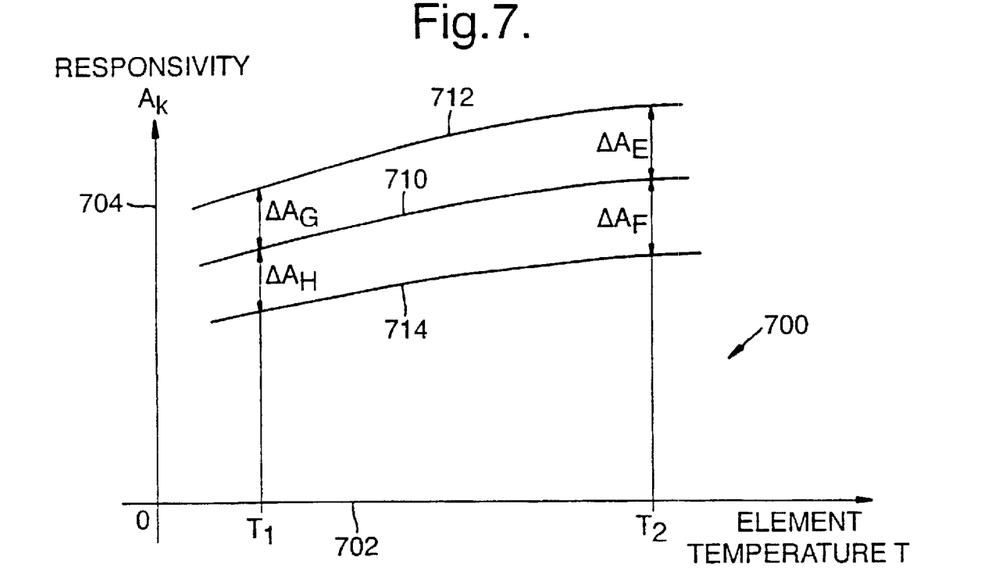
FIG. 7 is a graph illustrating element responsivity as a function of element temperature.

In accordance with the invention, it has been found surprisingly that, to calibrate the system 500 accurately, the correction required is both illumination dependent and temperature dependent. This is not disclosed in the prior art, and errors in FPN correction might be considered to be of a stochastic random nature. However, experimental investigation for the purposes of this invention has discovered that the photodetecting elements 528 in the array 526 each exhibit a responsivity $A_k$ which varies both as a function of radiation intensity incident on the element and as a function of element temperature. Moreover, each element exhibits a unique responsivity $A_k$ which in general will be different to that of other elements in the array 526. FIGS. 6 and 7 show element responsivity $A_k$ as a function of incident radiation intensity and element temperature in graphs 600 and 700 respectively.

The graph 600 has an abscissa axis 602 corresponding to radiation intensity $I_R$ incident on an element 528, and an ordinate axis 604 corresponding to element responsivity $A_k$. Three curves 610, 612, 614 indicate the photodetector responses of first, second and third elements with average, higher and lower responsivities respectively relative to one another. These curves 610, 612, 614 all show responsivity decreasing with increasing magnitude of radiation intensity $I_R$, which is due to element response saturation effects.

At a radiation intensity of $I_{R2}$, the curves 612 and 614 indicate that the second and third elements exhibit a difference in responsivity of $\Delta A_A$ and $-\Delta A_B$ respectively in comparison to that of the first element in curve 610. If FPN correction is performed as in the prior art for radiation intensity of $I_{R2}$, offset corrections of $-I_{R2}\Delta A_A$ and $I_{R2}\Delta A_B$ will be applied to signals generated by the second and third elements respectively to match them to the first element signal in calibration mode. However, these offset corrections will be wrong for a different radiation intensity of $I_{R1}$ incident of the array 526 when instead offset corrections of $-I_{R1}\Delta A_C$ and $I_{R1}\Delta A_D$ are appropriate for the second and third elements respectively. Thus, FPN correction applicable for one incident radiation intensity $I_{R2}$ will be wrong for another such intensity $I_{R1}$ for two reasons, namely that intensity and element responsivities have both changed.

In FIG. 7, the graph 700 has an abscissa axis 702 indicating element temperature T, and an ordinate axis 704 indicating element responsivity $A_k$. It has three response curves 710, 712, 714 for the first, second and third elements with average, relatively higher and relatively lower responsivities respectively. The curves 710, 712, 714 increase with increasing temperature T because:

(a) element bandgap decreases as temperature T increases; and (b) element leakage current increases as T temperature increases.

Decrease in element 528 bandgap as temperature T increases results firstly in more efficient generation of a photocurrent in each element 528 arising from generation of photon-induced electron-hole pairs; secondly, it results in increased gain in each element for conversion of photocurrent into output signal. Each curve 710, 712, 714 has a mutually different gradient.

At a temperature of $T_2$, the second and third elements have responsivities which differ by $\Delta A_E$ and $-\Delta A_F$ respectively relative to that of the first element. FPN correction performed in accordance with the prior art for the temperature $T_2$ and for a received radiation intensity of $I_R$ would result in offset corrections of $-I_R\Delta A_E$ and $I_R\Delta A_F$ being applied to signals generated by the second and third elements respectively to match them to the first element signal. However, these offset corrections will be wrong for a different temperature $T_1$ where offset corrections of $-I_R\Delta A_G$ and $I_R\Delta A_H$ would be appropriate for the second and third elements respectively. Thus, FPN correction determined for one temperature is wrong for another because responsivity $A_k$ changes with temperature.

When the system 500 is employed in a camera, for example a stills camera for recording static images, it is preferable to execute both the calibration and measurement modes for each scene to be viewed and recorded. This is because each scene may be different with regard to illumination compared to a previous scene. Moreover, temperature of the system 500 may vary from scene to scene.

However, it is not always practical to execute the calibration mode for each measurement mode when the system 500 is incorporated into a video camera because the latter employs a relatively high frame update rate of approximately 50 frames/second. It is preferable in video cameras incorporating the system 500 to execute the calibration mode only in response to illumination or temperature change. The calibration mode may be executed manually by the operator pressing a switch incorporated into the system 500 to instruct the controller unit 504 to perform the calibration mode.

Figure 8:
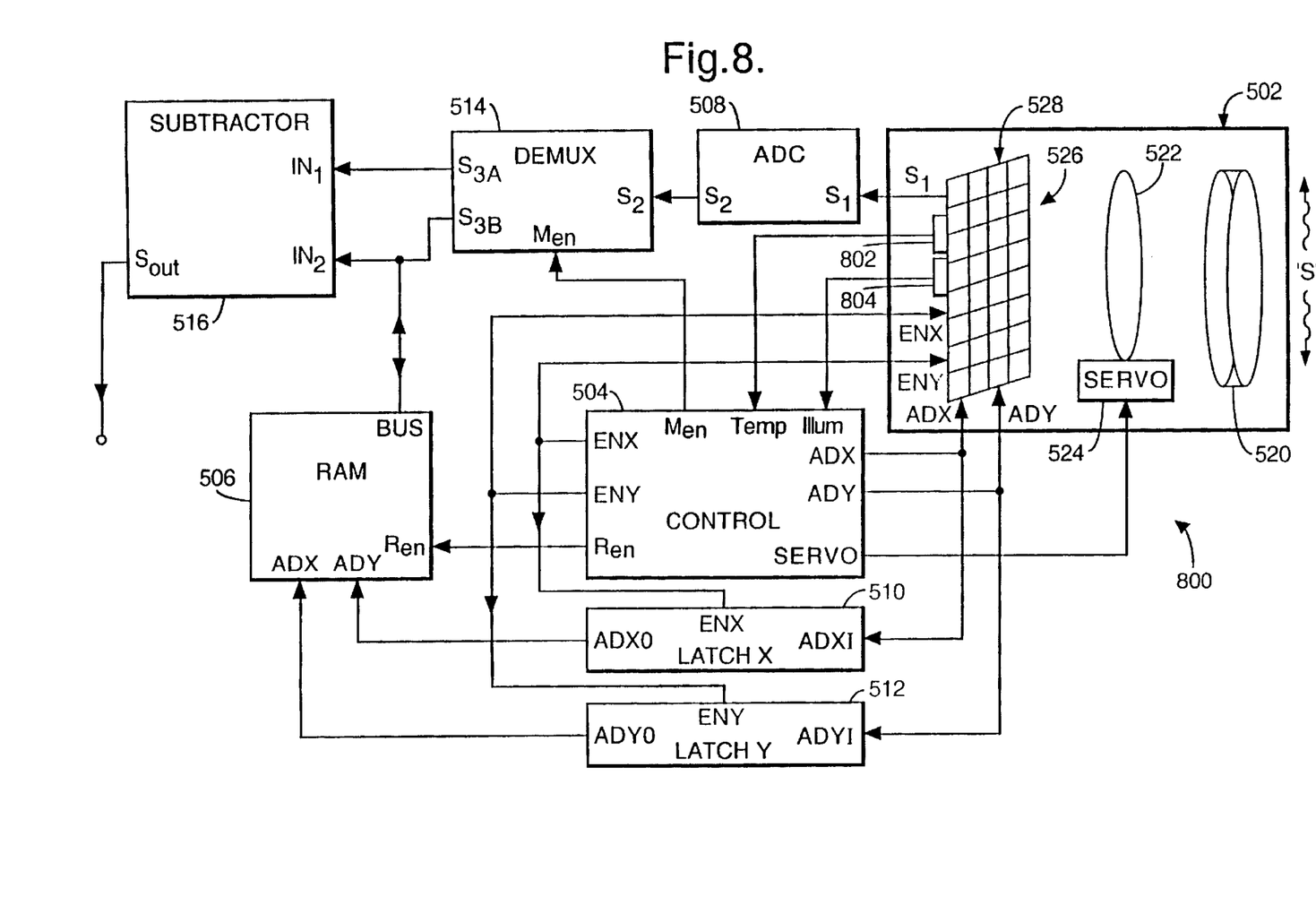
FIG. 8 is the alternative embodiment of the invention in FIG. 5 incorporating illumination and temperature sensors.

A modified version of the system 500 in shown in FIG. 8; it is indicated generally by 800. The system 800 incorporates like referenced items from the system 500 except that temperature and illumination sensors 802, 804 are incorporated with the array 526 and are connected to the controller unit 504 to provide it with temperature and illumination data. The controller unit 504 is configured to record the data from the sensors 802, 804 as reference data each time a calibration mode is executed. When the controller unit 504 detects that one of more of current temperature and illumination data have changed by more than a threshold amount from the reference data, the calibration mode is executed and the current data is then recorded as the reference data. The temperature and illumination sensors 802, 804 may either be located adjacent to or integrated as part of the array 526. Incorporation of the temperature sensor 802 allows recalibration to be triggerable by changes in array 526 temperature thereby providing an automatic correction for FPN and offset drift dependent upon temperature whilst interrupting system 800 operation relatively infrequently.

The recalibration and measurement modes described above may be executed when the system 800 incorporates a continuous-time MOS detector for the array 526, for example the FUGA-15 device, as well as MOS reset detectors operating in reset and exposure cycles, for example as employed in a commercially available JPL APS system. Continuous-time detectors provide an output signal from each of their elements corresponding to radiation coincidentally incident thereon whereas reset detectors provide an output signal from each of their elements corresponding to an integral of radiation incident thereon during a set time duration. The continuous-time detectors generally exhibit greater FPN than reset detectors. When the systems 500, 800 incorporates the reset detector of the APS system, it is necessary to reset the detector and expose it once to a diffuse image of the scene by moving the shutter 522 to the second position, and then reset it and expose it to a non-diffuse image of the scene by removing the shutter 522 to the first position. Continuous-time detectors such as the FUGA-15 device provide an advantage here in that they do not need to be reset.

Although the systems 500, 800 are responsive to visible radiation, the array 526, the lens unit 520 and the shutter 522 may be replaced by equivalent items capable of operating at other radiation wavelengths, for example at infra-red radiation and at X-ray radiation wavelengths.

Figure 9:
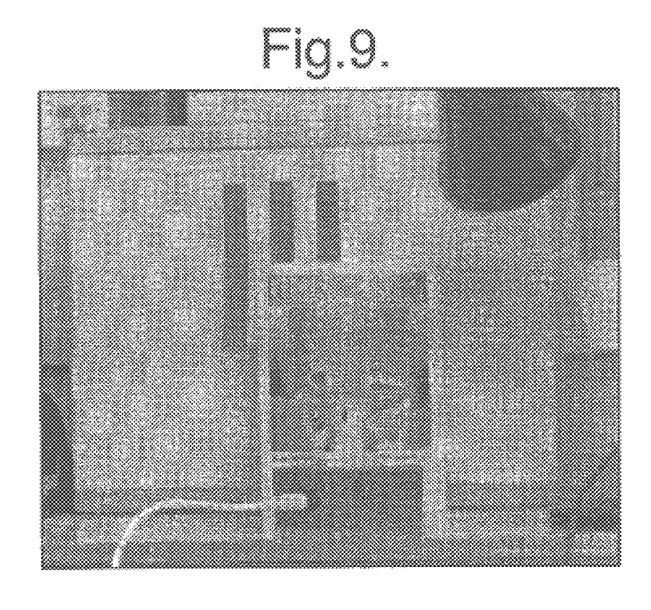
FIGS. 9, 10, 11, 12 are four views recorded using an embodiment of the invention in FIG. 5 which illustrate image quality improvement provided by FPN correction.
Figure 10:
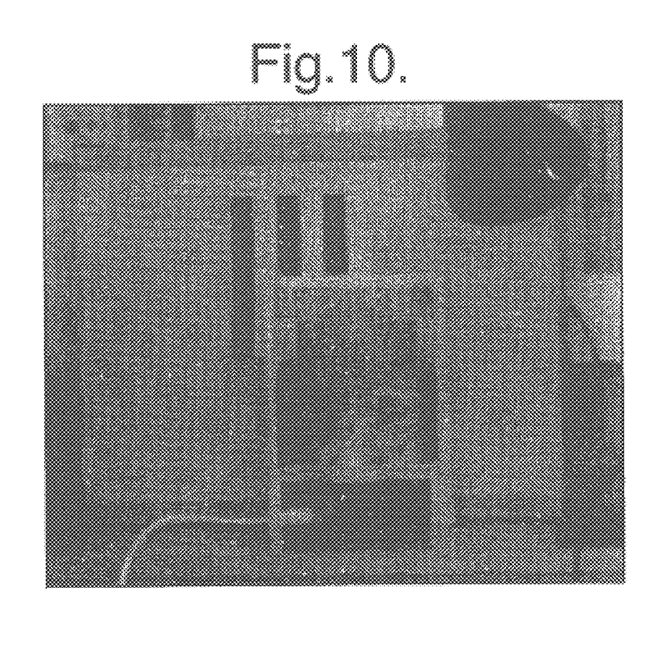
Figure 11:
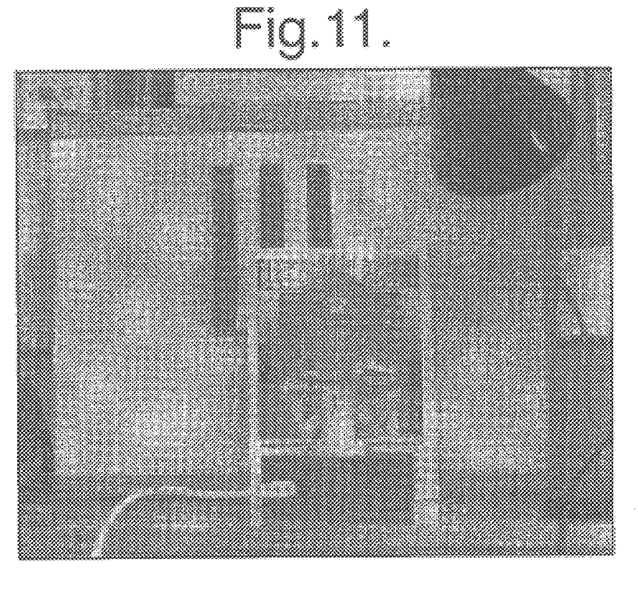
Figure 12:
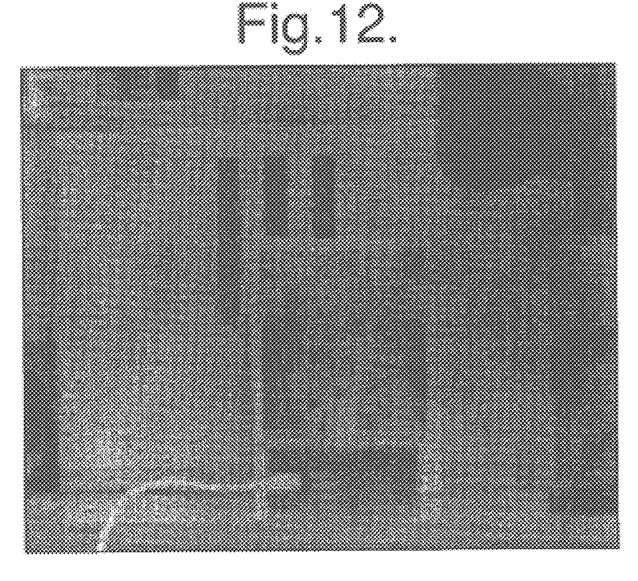

Referring now to FIGS. 9, 10, 11, 12, there are shown four views of a scene as provided at the output $S_{out}$ of the system 500. FIG. 9 corresponds to a view of the scene when brightly illuminated to which the system 500 has been calibrated. In FIG. 9, FPN is not noticeable. When illumination of the scene is subsequently reduced to provide a darkened scene without recalibrating the system 500, FPN becomes noticeable as lighter speckles as illustrated in FIG. 10. These lighter speckles can be removed by recalibrating the system 500 to the darkened scene as illustrated in FIG. 11. In FIG. 11, FPN is not noticeable. However, when illumination of the scene is subsequently increased again, FPN becomes visible as darker speckles as illustrated in FIG. 12. A similar effect occurs when the temperature of the system 500 is altered after calibration. Thus, FIGS. 9 to 12 demonstrate that recalibration of the system 500 in response to changes in environmental parameters, for example scene illumination, is necessary for maintaining image quality provided at the output $S_{out}$.

Figure 13:
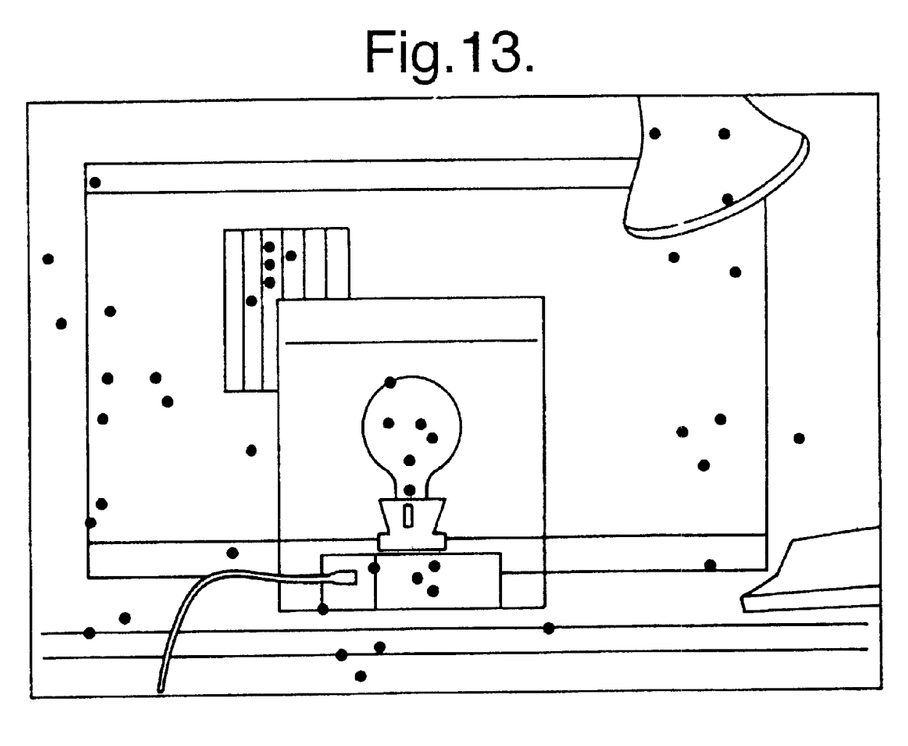
FIG. 13 is an outline view of the views shown in FIGS. 9 to 12 where locations of FPN speckle are represented by circles in the outline view.

FIG. 13 is an outline view of the views shown in FIGS. 9 to 12 where locations of particularly noticeable FPN are represented by circles in FIG. 13.

The invention may be used with multielement arrays whose elements each incorporate one or more of a cadmium-mercury-telluride photodiode, a photodiode with MOS readout, a phototransistor with MOS readout, a photogate with MOS readout and a photodiode with CCD readout.

Although embodiments of the invention described above are arranged to be responsive to infrared and visible radiation, the invention may in an alternative embodiment be arranged to respond to ultrasonic, X-ray or microwave radiation by employing a multielement array responsive to such radiation and employing one or more focusing devices, such as reflectors, arranged for such radiation to project images of differing degree of blurring relative to one another onto the array.

The systems 500, 800 may be operated so that a substantially focused image and a partially blurred image are projected onto the array 526 during the calibration mode and the measurement mode respectively, such that a signal is recorded in the RAM 506 corresponding to a substantially focused image. This provides an advantage that image tone reversal in the signal at the output $S_{out}$ is thereby achieved.

What is claimed is:

1. A sensor system (800) for generating a sensor signal corresponding to a filtered image of a scene, the system incorporating:
   (i) detecting means (526) incorporating a plurality of detector elements (528) for generating element signals during first and second detection phases; and
   (ii) processing means (504 to 516) for processing element signals from both detectionphases to generate a sensor signal in which fixed pattern noise is counteracted,
   characterised in that the system incorporates sensing means (802,804) responsive to illumination of the detecting means (526) by incident radiation affecting detector element responsively and the system (800) is arranged to repeat both detection phases in response to illumination change.

2. A system (800) according to claim 1 characterised in that:
   (i) the sensing means (802,804) is responsive to at least one of temperature and illumination at the detecting means (526); and
   (ii) the system (800) is arranged to repeat both the first and second phases in response to change in at least one of temperature and illumination by more than a preset value.

3. A system according to claim 1 characterised in that it incorporates projecting means (502) for projecting scene images onto the detecting means (528) so that at least one element signal is generated during a diffuse image phase.

4. A system according to claim 3 characterised in that the projecting means incorporates actuating means (524) for interposing radiation scattering means (522) between the scene and the detecting means (526).

5. A system according to claim 4 characterised in that the actuating means (524) comprises at least one of solenoid means and means for translating and rotating the scattering means to interpose it between a scene and the detecting means (526).

6. A system according to claim 4 characterised in that the scattering means (522) incorporates at least one of the following: a ground glass plate, a translucent plastic sheet, a sheet of tracing paper, a microprism sheet, a Fresnel plate and a phase plate.

7. A system according to claim 3 characterised in that the projecting means is arranged so that radiation corresponding to that receivable on one element from a focused image is received by between two elements and 64% of the elements when the image is diffuse.

8. A system according to claim 1 characterised in that:
   (i) it incorporates projecting means (502) for projecting scene images onto the detecting means (528);
   (ii) the projecting means (502) is arranged to project a local spatial average image onto the detecting means (528) during one of the phases and a focused measurement image during another of the phases; and
   (iii) the processing means (504 to 516) is arranged to generate the sensor signal from the element signals derived from the local average and measurement images.

9. A system according to claim 8 characterised in that the measurement image is projected onto the detecting means prior to the local spatial image, thereby providing image tone reversal in the sensor signal.

10. A system according to claims 8 characterised in that the projecting means incorporates a liquid crystal spatial light modulator configured to be controllable between a first substantially non-scattering state and a second diffusing state as regards transmission of radiation from the scene to the detecting means (526) in both cases.

11. A system according to claim 10 characterised in that the liquid crystal modulator is a polymer dispersed liquid crystal device (PDLC) having scattering and non-scattering states which are selectable in response to a control potential applied to the device.

12. A system according to claim 11 characterised in that the device incorporates a liquid crystal material having negative dielectric anisotropy in a polymer matrix arranged to provide a degree of light scattering which increases in response to increasing control potential applied thereto.

13. A method of improving imaging by a sensor system for generating a sensor signal corresponding to a filtered image of a scene, the system incorporating a detector having a plurality of detector elements and the method including the steps of:

(i) generating element signals during first and second detection phases; and (ii) processing clement signals from both detection phases to generate a sensor signal in which fixed pattern noise is counteracted, wherein the system is responsive to illumination of the detector by incident radiation affecting detector clement responsivity and the method includes the step of repeating both detection phases in response lo illumination change.

14. A method according to claim 13 characterised in that radiation corresponding to that received on one element (528) from the focussed image is received by at least two elements and not more than 64% of the elements (528) from the partially blurred image.

* * * * *

UNITED STATES PATENT AND TRADEMARK OFFICE
CERTIFICATE OF CORRECTION

PATENT NO. : 6,414,294 B1
DATED : July 2, 2002
INVENTOR(S) : Marshall et al.

It is certified that error appears in the above-identified patent and that said Letters Patent is hereby corrected as shown below:

Column 16,
Line 16, "detectionphases" should read -- detection phases --;
Line 21, "responsively" should read -- responsivity --; and Column 18,
Line 13, "response lo" should read -- response to --.

Signed and Sealed this

Twenty-first Day of January, 2003

JAMES E. ROGAN
*Director of the United States Patent and Trademark Office*